TRANSFORMERLESS CONVERTER-INVERTER

Filed Dec. 26, 1967 3 Sheets-Sheet 1

INVENTOR
ROBERT L. HYDE
BY Arthur M. Sloan
ATTORNEY

TRANSFORMERLESS CONVERTER-INVERTER

Filed Dec. 26, 1967 3 Sheets-Sheet 2

INVENTOR
ROBERT L. HYDE
BY Arthur M. Sloan
ATTORNEY

TRANSFORMERLESS CONVERTER-INVERTER

Filed Dec. 26, 1967 3 Sheets-Sheet 3

INVENTOR
ROBERT L. HYDE
BY Arthur M. Sloan
ATTORNEY 3,465,231

TRANSFORMERLESS CONVERTER-INVERTER

Robert L. Hyde, Plano, Tex., assignor to Varo, Inc.

Filed Dec. 26, 1967, Ser. No. 693,273
Int. Cl. H02m 3/22, 5/40
U.S. Cl. 321—2 12 Claims

ABSTRACT OF THE DISCLOSURE

An electronic converter for converting low voltage input direct current to high voltage direct current output at significant power levels without the use of a power transformer. An electronic inverter for obtaining an alternating current output from a high voltage direct current input without the use of a power transformer.

This invention relates to a transformerless converter-inverter. It includes a DC transformation system capable of transforming low voltages to high voltages. Taps are commonly provided at each multiple of voltage.

The voltage transformation system of the invention has very low magnetic flux densities due to the absence of a power transformer with ferro magnetic components. In addition the system is light weight since there is no power transformer with ferro magnetic components.

The DC voltage transformation system is very quiet in operation since the large flux densities which give rise to acoustic vibration are absent.

The converter-inverter of this invention is a high frequency DC to AC inverter that will switch high currents and powers with a minimum of semiconductors, each of which gives maximum gain. Due to the use of complementary transistors optimum signals are given to each power transistor base.

The DC to AC inverter of this invention can be used for very high frequency switching since the power transistors are kept out of saturation because the collectors never fall below the base potential (npn) or rise above the base potential (pnp), and thus do not have the "storage time" effect which is the time taken to sweep charge carriers out of the blocking junction and base regions. Since special doping must be used to ensure short storage times for many transistors, the elimination of the special doping requirement makes possible the use of cheaper transistors. Another adverse effect of storage time which is avoided is an overlap of transistor "on" and "off" time which would result in a partial short circuit with the input terminals causing unnecessary transistor heating and severe loss of efficiency.

The converter-inverter of this invention could be used for either DC or AC power output by switching a low frequency high voltage inverter in or out of the circuit.

Because of the absence of a transformer the converter-inverter of this invention can give very low output frequencies at high power levels at very light weights.

The converter-inverter of this invention can change output frequencies by changing a switch.

The converter-inverter of the invention has built in overload protection since no transformer saturation can occur if two transistors are left on and the others off because there is no transformer, and no current will flow after the capacitors are charged up because there is no DC path.

The converter-inverter has short circuit protection so that in case the output voltage becomes less than the DC voltage for a sufficient time to draw excess current from the input DC supply through a power rectifier, the output fuse will blow thus protecting the switching semiconductors from the excess current.

The converter-inverter can use stepped waveform inversion to eliminate objectionable harmonies from the output waveform. Several steps are possible since equal voltage taps are available by the inherent nature of the system.

The converter-inverter accomplishes output voltage regulation by means of phase shifting one set of bridge transistors and giving a quasi-square wave voltage to the parallel multiplier which lowers the output voltage proportionately.

The converter-inverter operates at a very high efficiency at full power and also operates at good partial power efficiencies because the driver current feeds into the output load, and when the load is light the current drawn from the power supply is light. Since power transistors gain tends to fall at high current levels, the base drive current may be 10% of the total current of the output transistors, and this represents a substantial increase in efficiency over prior art circuits that bypass the gate drive from the load.

The converter-inverter utilizes a complementary Darlington transistor drive circuit that operates at better efficiencies than conventional Darlington drive circuits using similar type transistors because the collector emitter saturation voltage of the driver transistors is lower than the base emitter voltage (sometimes by a factor of 2), and thus the power transistor base emitter voltage can be higher for a given collector to emitter voltage than the conventional Darlington circuit where by two base emitter voltages are in series.

Power outputs exceeding 300 watts at effiiciencies of 80% have been achieved with the subject invention.

It is, therefore, an object of the present invention to provide a DC voltage transformation system capable of transforming low voltages to high voltages.

Another object of the invention is to provide a DC voltage transformation system which has very low weight in comparison with prior art devices due to the absence of magnetic and ferrous materials because of the elimination of a transformer.

Still another object of the invention is to provide a voltage transformation system with very low magnetic flux densities due to the absence of ferro magnetic components.

Yet another object of the invention is to provide a voltage transformation system which is very quiet in operation due to the absence of large flux densities.

A further object of the invention is to provide a low voltage high frequency DC to AC inverter that will switch high currents and powers with a minimum of semiconductors, each of which gives maximum gain and optimum signals to each power transistor base.

Still a further object of the invention is to provide a converter-inverter that can be used for very high frequency switching.

Yet a further object of the invention is to provide a converter-inverter that can be used for either AC or DC power output.

Another object of the invention is to provide a converter-inverter that gives low output frequencies at high power levels at light weights.

A further object of the invention is to provide a converter-inverter with a built in overload protection.

A still further object of the invention is to provide a converter-inverter with short circuit protection.

Still another object of the invention is to provide a converter-inverter that uses stepped waveform inversion.

Still a further object of the invention is to provide a converter-inverter which accomplishes output voltage regulation.

Yet still another object of the invention is to provide a converter-inverter that operates with a very high efficiency at full power and at good partial power efficiencies.

Other purposes and advantages resulting from my invention should be apparent to those skilled in the art by a reference to the following specification taken in connection with the accompanying drawings, and it will be understood that I may make any modifications in the specific features hereinafter described within the scope of the invention without departing from or exceeding the spirit of my invention.

Referring to the drawings.

Figure 1:
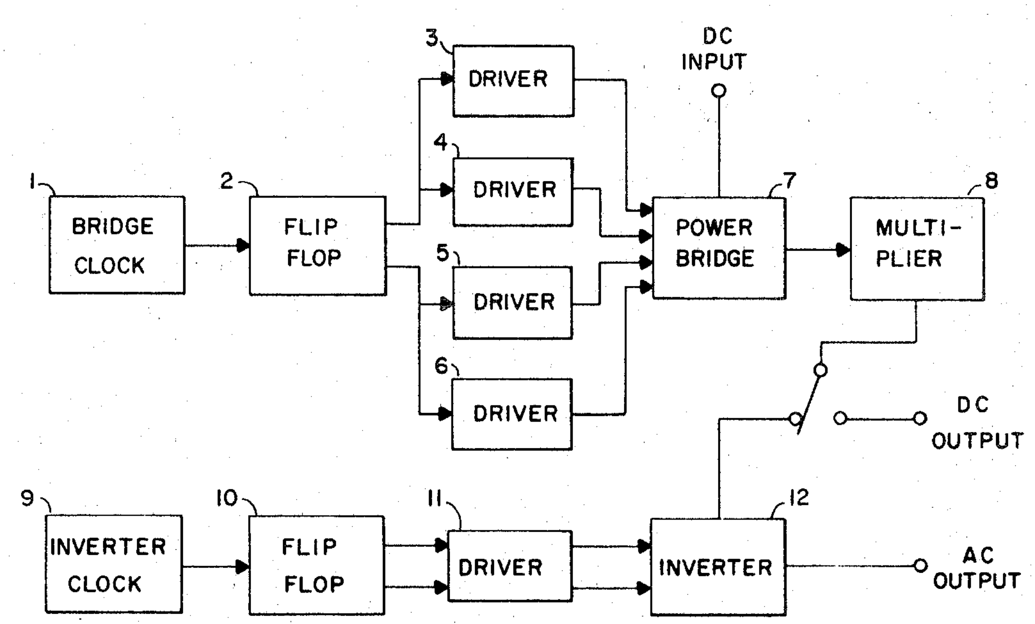
FIGURE 1 is a block diagram showing the principles of operation of the invention.

In FIGURE 1 the bridge clock 1 which is any suitable trigger source is applied to the flip-flop 2 whose outputs are applied to the drivers 3, 4, 5, and 6. The drivers control power switches in the power bridge 7. The output of the power bridge 7 is a square wave voltage which is applied to the parallel multiplier 8. The output of parallel multiplier 8 can be used as a high voltage DC source in the DC to DC conversion mode or such output can be applied as input power to DC to AC inverter 12. The inverter clock 9 provides timed trigger signals to flip-flop 10. The outputs of flip-flop 10 are in turn applied to the inverter driver circuit 11 which provides driving signals to the DC to AC inverter 12.

Figure 2:
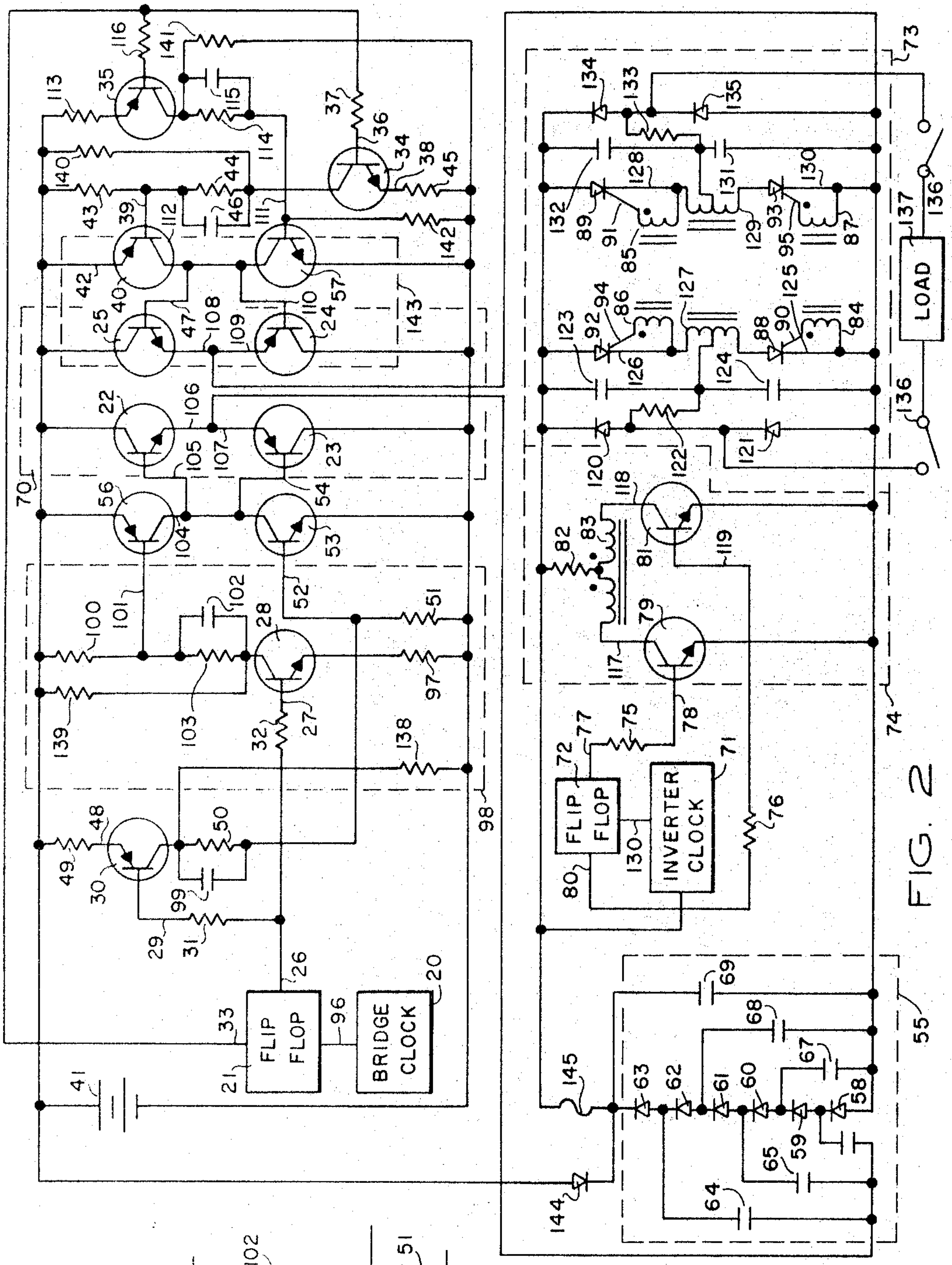
FIGURE 2 is a schematic diagram showing a configuration of the transformerless converter-inverter.

In FIGURE 2 the bridge clock 20 provides timing trigger signals to flip-flop 21. The circuit is arranged so that each side of flip-flop 21 provides drive to two different transistors in the power bridge which includes transistors 22, 23, 24, and 25. Consider the output of one side of the flip-flop 21 at terminal 26. This output provide a positive signal to the base 27 of transistor 28 for one-half cycle of the flip-flop 21 period and a negative signal to the base 29 of transistor 30 for the alternate one-half cycle. Resistors 31 and 32 prevent transistors 30 and 28 from loading the flip-flop. An analogous situation exists for the other side of the flip-flop 21 at terminal 33 and transistors 34 and 35.

Assuming that terminal 33 of flip-flop 21 is going negative, the positive going signal is coupled to base 36 of transistor 34 by isolation resistor 37 thus raising the base 36 voltage far enough above the emitter 38 voltage to turn transistor 34 on. This drops the voltage on base 39 of transistor 40 from near the supply 41 value E far enough below emitter 42 voltage to turn transistor 40 on. Resistors 43, 44, and 45 provide current limiting for transistor 34 and set the correct base 39 bias for transistor 40 by voltage divider action. Capacitor 46 assists the initial turn-on of transistor 40 by lowering the initial voltage on base 39. Turning transistor 40 on raises the base voltage at base 47 of transistor 25 which turn on transistor 25. One leg of the power bridge is now on.

The negative going signal at terminal 26 of flip-flop 21 is coupled to base 29 of transistor 30 by isolation resistor 31. This negative signal at base 29 is far enough below emitter 48 voltage so that transistor 30 is turned on. Turning transistor 30 on places the supply 41 voltage E across the voltage divider and current limiting resistors 49, 50, and 51. This raises the voltage bias on base 52 of transistor 53 and turns it on. Turning on transistor 53 reduces the voltage on base 54 of transistor 23 turning it on. Transistors 25 and 23 are now both on and current can be conducted through parallel multiplier 55.

Transistors 28, 56, and 22 operate in the same manner as transistors 25, 40, and 34 when the output terminals 33 and 26 reverse for the next half cycle. Likewise transistors 35, 57, and 24 operate in the same manner as transistors 30, 53, and 23 did on the previous half cycle.

The parallel multiplier 55 includes diodes 58, 59, 60, 61, 62, and 63 and capacitors 64, 65, 66, 67, 68, and 69. Operation of the multiplier 55 which was developed for use in this invention is as follows: As the current through the multiplier 55 is reversed by the switching action of the power bridge 70, the capacitors are successively charged in increments of supply 41 voltage E until an ultimate voltage of 6E is imposed on capacitor 69. This value of 6E will be the DC output in the DC to DC conversion mode or the DC input to the inverter in the DC to AC inversion mode. The fact that there are several parallel paths for the current and each path has a minimum equivalent resistive loss makes for maximum possible efficiency.

The inverter clock 71 provides timing trigger signals to the flip-flop 72. The inverter clock 71 can produce signals for either 60 or 400 cycle operation of the DC to AC inverter 73. Flip-flop 72 provides signals to the SCR driver circuit 74. Resistors 75 and 76 prevent the driver circuit 74 from loading flip-flop 72. When terminal 77 of flip-flop 72 goes positive this is coupled to base 78 of transistor 79 and turns the transistor 79 on. When terminal 80 of flip-flop 72 goes positive, transistor 81 is turned on in the same manner, and transistor 79 is turned off by the negative signal then present at terminal 77.

This switching action in transistors 79 and 81 causes current to flow through current limiting resistor 82 to opposite halves of primary transformer winding 83 on alternate half cycles. Secondary windings 84 and 85 are tightly coupled to one-half of primary winding 83 and secondary windings 86 and 87 are tightly coupled to the other half of primary winding 83. Signals of positive polarity are therefore applied to SCR 88 and 89, gate electrodes 90 and 91 on one-half cycle and to SCR 92 and 93 gate electrodes 94 and 95 for the other half cycle.

The trigger connection from the bridge clock 20 to the flip-flop 21 is designated 96.

Resistors 97, 113, 49, and 45 are emitter resistors to control the amount of current drawn through the first driver.

A typical amplifier and driver stage giving a unique alternating voltage to the bases of the drive transistors is set off in dashed box 98.

Capacitors 99, 102, 115, and 46 are all pump up capacitors which lower the turn on impedance to the gate, i.e., assist the initial turn on of the transistors 53, 56, 57, and 40 by lowering the initial voltage on transistor bases 52, 101, 111, and 39.

Resistors 100, 51, 43, and 142 couple the bases of the driver transistors to the supply terminals.

Resistors 103, 114, 44, and 50 are steady state biasing resistors for driving the bases of transistors 56, 57, 40, and 53.

The collector electrodes of the drive transistors 56 and 40 are denoted respectively 104 and 112.

The bases of the power transistors 22, 23, 25, and 24 are designated respectively 105, 54, 47, and 110.

The emitter electrodes 106 and 107 of the left hand of the power transistor 70 are connected to one side of the power multiplier stage 55.

The emitters 108 and 109 of the right hand of the power transistor stage 70 are connected to the other side of the power multiplier stage 55.

The driver transistor 56, 40, 57, and 53 bases 101, 39, 111, and 52 alternately go above and below the supply level depending on whether it is on or off. The bases 101, 39, 111, and 52 are back biased during the off period to assist turn off and reduced off leakage. There is back bias without transformers due to the unique way in which the drivers are connected to the power stage.

Resistors 116, 31, 32, and 37 are current limiting resistors to limit the current put in to the bases of the first amplifier transistors 28, 30, 34, and 35.

The collector electrodes 117 and 118 of transistors 79 and 81 are used for applying AC voltage to the pulse transformer 83.

Base electrodes 119 and 78 of driver transistors 81 and 79 perform the same function on complementary sides of the flip-flop 72.

Diodes 120, 121, 134, and 135 are reactive diodes which allow turn off of SCRs 92, 88, 89, and 93. Diodes 120, 121, 134, and 135 are also used to carry reactive current non-unity power factor loads.

Resistors 122 and 133 are current limiting resistors to limit the amount of turn off current flowing during the SCR turn off interval.

Capacitors 123, 124, 131, and 132 are commutating capacitors used for storing energy to turn off SCRs 92, 88, 89, and 93.

Cathode electrodes 125, 126, and 128, and 130 of SCRs 88, 92, 89, and 93 are connected to one side of the pulse transformer.

Commutating inductors 127 and 129 hold off DC voltage across SCRs 88 and 93 while they are being turned on and complementary SCRs 92 and 89 are being turned off.

Leads 136 are connected to the load 137.

Resistors 138, 139, 140 and 141 are pump up resistors to induce backbiases on the driver transistors during the off period.

Driver power stage 143 is a unique coupling system which interconnects the driver transistors to the power transistors while eliminating storage time overlap.

Diode 144 and fuse 145 are not essential to the system and may be omitted. Diode 144 and fuse 145 provide an interconnection network to eliminate a potential short circuit across the input semiconductors because of load or output short circuit.

Figure 3:
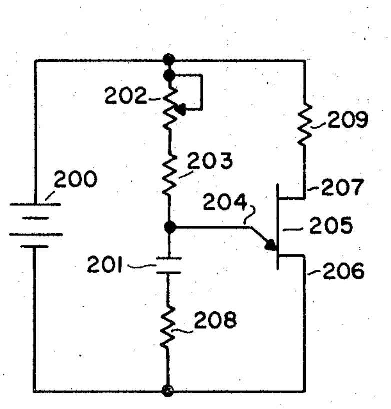
FIGURE 3 is a schematic diagram of a typical bridge block circuit.

A typical bridge clock circuit that could be used for the bridge clock of FIGURE 2 is shown in FIGURE 3. The circuit of FIGURE 3 is a unijunction oscillator circuit. Power is furnished by power supply 200. Capacitor 201 is charged toward the supply voltage through resistors 202 and 203. Resistor 202 can be used to vary the charging time and thereby change the frequency of oscillation. When the voltage of emitter electrode 204 of unijunction transistor 205 reaches a value equal to approximately half the potential between base one electrode 206 and base two electrode 207, the unijunction transistor 205 fires and capacitor 201 discharges through the emitter electrode 204 and base one electrode 206 junction. Resistor 208 limits the current. Resistor 209 has the effect of stabilizing the temperature-frequency characteristics of the unijunction transistor 205. Other types of oscillators differing from the circuit of FIGURE 3 may be used as bridge clocks in the circuit of FIGURE 2.

Figure 4:
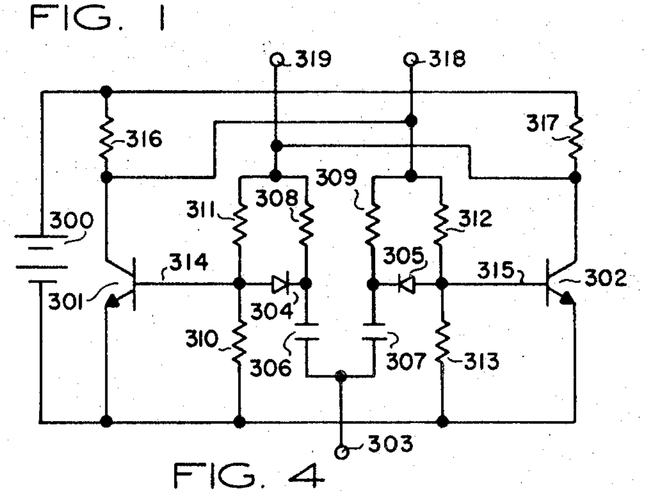
FIGURE 4 is a schematic diagram of a typical flip-flop circuit.

FIGURE 4 shows a typical flip-flop circuit which may be used for flip-flops 21 and 72 in FIGURE 2. The power supply 300 furnishes power to the transistors 301 and 302 which are triggered off alternately by negative signals at the trigger input 303. Diodes 304 and 305, capacitors 306 and 307, and resistors 308 and 309 are the steering network to guide the trigger pulses to the transistors 301 and 302. Resistors 310, 311, 312, and 313 provide bias for the base electrodes 314 and 315 of transistors 301 and 302. Resistors 316 and 317 limit the transistor currents to a safe value. Outputs 318 and 319 connect to the driver power stage amplifiers. Flip-flops differing from the circuit of FIGURE 4 may be used in the circuit of FIGURE 2.

Figure 5:
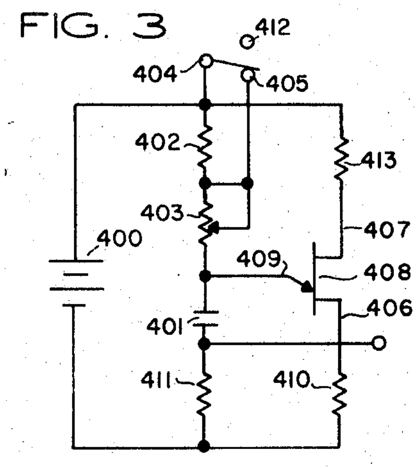
FIGURE 5 is a schematic diagram of one type of inverter clock.

FIGURE 5 depicts one type of inverter clock that may be used in the circuit of FIGURE 2. The power supply 400 furnishes power to the circuit. Capacitor 401 is charged at a rate determined by resistors 402 and 403 and the position of switch 404. When switch 404 is in the 400 Hertz position 405, the time for capacitor 401 to be charged to a value approximately equal to half the potential between base one electrode 406 and base two electrode 407 is set at an 800 cycle period. The charging time is set at a 120 Hertz period for 60 Hertz operation. The unijunction transistor 408 fires when the voltage at its emitter electrode 409 reaches this voltage and capacitor 401 discharges through the emitter electrode 409 and base one electrode 406 junction. Resistor 410 limits the current. The output is taken across resistor 411. The 60 Hertz position of the switch 404 is indicated at 412. Resistor 413 has the effect of stabilizing the temperature-frequency characteristics of the unijunction transistor 408. Inverter clock circuits differing from the circuit of FIGURE 5 may be used in the circuit of FIGURE 2.

Figure 6:
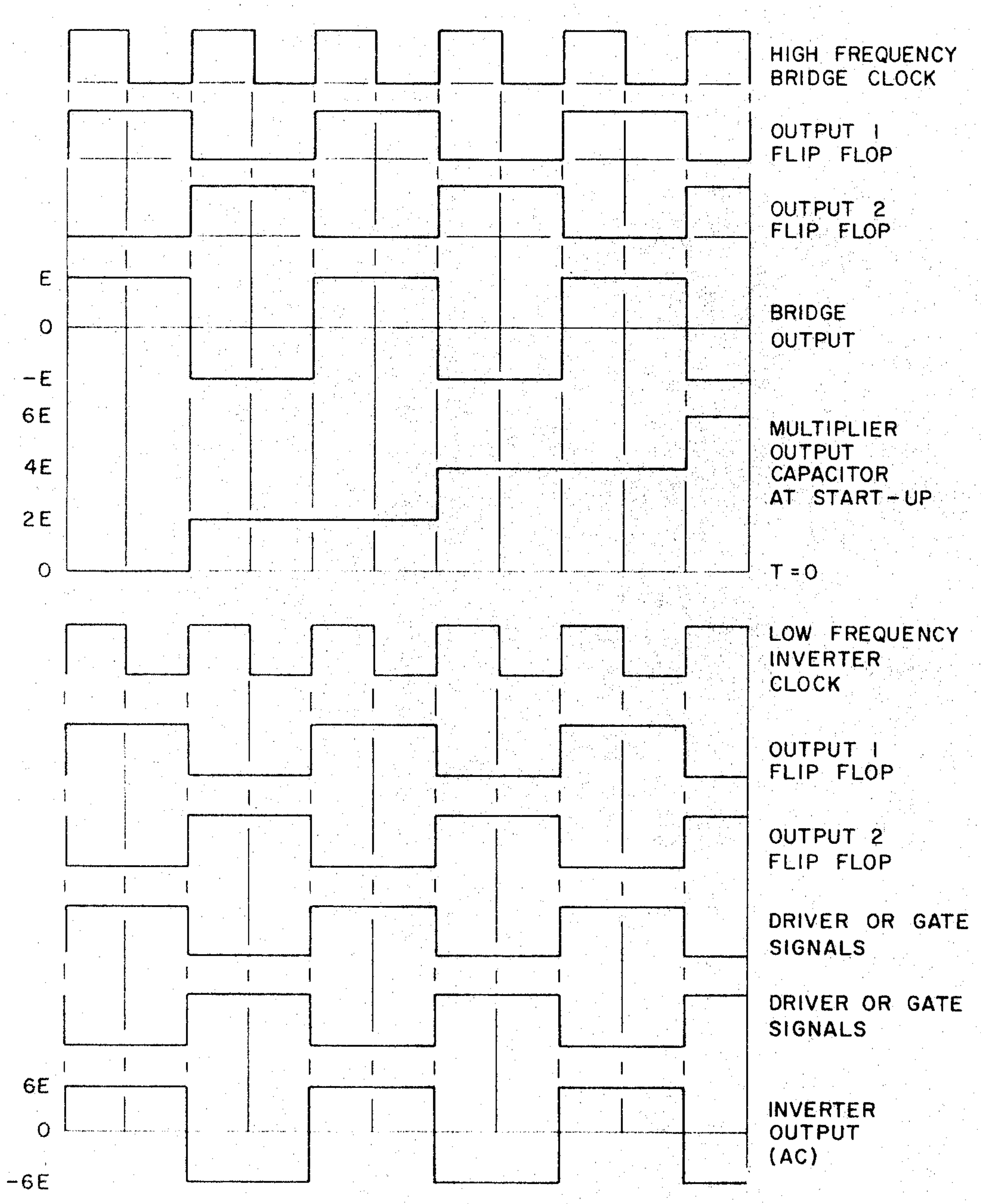
FIGURE 6 is a set of waveforms for the converter-inverter system.

FIGURE 6 shows the various waveforms for the basic circuit of the invention which is shown in FIGURE 2.

Figure 7:
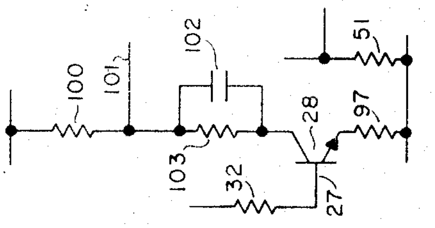
FIGURE 7 is a schematic diagram of the pump up amplifier driver stage.

FIGURE 7 shows the essential elements of the amplifier driver stage 98 of FIGURE 2.

It should be understood that while the invention has been illustrated in connection with a given circuit arrangement, it is readily adaptable to other systems without departure from the spirit thereof.

What is claimed is:

1. An electronic converter-inverter for converting DC voltage to higher DC voltage and for converting the higher DC voltage to AC voltage including a trigger source, a flip-flop connected to the trigger source, a first set of drivers connected to the flip-flop outputs, a power bridge with a square wave output voltage having power switches which are controlled by the first set of drivers, a DC input voltage to the power bridge, a multiplier connected to the square wave output of the power bridge said multiplier having a DC output voltage which is higher than the DC input voltage and which higher DC voltage can be used as a high voltage DC source and as input power to a DC to AC inverter, an inverter clock, a second flip-flop connected to the inverter clock to receive timed trigger signals from the inverter clock, a second driver connected to the output of the second flip-flop, and a DC to AC inverter receiving its driving signals from the other driver and receiving its input power from the multiplier.

2. An electronic converter-inverter as described in claim 1 in which each output of the first flip-flop is connected to two drivers.

3. An electronic converter-inverter as described in claim 1 in which each driver in the first set of drivers includes two transistors, one of which two transistors has its base electrode connected to the first flip-flop and its collector electrode connected to the base electrode of the second transistor, and said first transistor receives a positive signal at its base electrode for one-half cycle of the flip-flop period said positive signal raising the base electrode voltage above the emitter electrode voltage to turn the first transistor on thus dropping the voltage on the base electrode of the second transistor below the emitter electrode voltage of the second transistor to turn the second transistor on.

4. An electronic converter-inverter as described in claim 3 including a resistor in series with the base electrode of the first transistor, to prevent the first transistor from loading the flip-flop.

5. An electronic converter-inverter as described in claim 3 in which the first set of drivers includes four drivers, two of which are connected to one output of the first flip-flop through the base electrode of their first transistors and two of which are connected to the second output of the first flip-flop through the base electrodes of the first transistors, the second transistors in each driver connected to the first output of the first flip-flop having their collector electrodes connected to each other, and the second transistors in each driver connected to the second output of the first flip-flop having their collector electrodes connected to each other.

6. An electronic converter-inverter as described in claim 5 including four transistors in the power bridge, each of said transistors having its base electrode connected to the collector electrode of one of the second transistors in the first set of drivers, each two power bridge transistors whose base electrodes are connected to interconnected collector electrodes of the second transistors in the first set of drivers being thereby interconnected, the emitter electrodes of each set of power bridge transistors having interconnected base electrodes being connected to each other, and the collector electrodes of each of the power bridge transistors being connected to the DC input voltage.

7. An electronic converter-inverter as described in claim 6 in which in each set of power bridge transistors whose emitter electrodes are connected to each other, one such transistor is an NPN transistor and one such transistor is a PNP transistor.

8. An electronic converter-inverter as described in claim 5 in which the first transistors in two of the drivers in the first set of drivers are NPN transistors and the first transistors in the other two drivers in the first set of drivers are PNP transistors, each of the first NPN transistors having its collector electrode connected to the base electrode of a second PNP transistor and each of the first PNP transistors having its collector electrode connected to the base electrode of a second NPN transistor.

9. An electronic converter-inverter as described in claim 6 in which the multiplier is a parallel multiplier with multiple parallel paths for the current including a number of diodes arranged in series between the power bridge and the inverter.

10. An electronic converter-inverter as described in claim 9 including a capacitor connected between the cathode electrode of each multiplier diode and the power bridge so that as the current through the multiplier is reversed by the switching action of the power bridge the multiplier capacitors are successively charged in increments of the DC input voltage until an ultimate voltage which is a multiple of the number of multiplier capacitors is imposed on the capacitor connected to the cathode of the last multiplier diode in the series at its connection to the inverter, said ultimate voltage being the DC output of the inverter.

11. An electronic converter-inverter as described in claim 10 in which the second driver includes two transistors and a primary transformer winding, each transistor having its base electrode connected to a different output of the second flip-flop and its collector electrode connected to a different end of the primary transformer winding, said primary transformer winding being connected by a center tap to one side of the inverter, and the emitter electrodes of the two transistors of the second driver being connected to each other and to a line running to the other side of the inverter.

12. An electronic converter-inverter as described in claim 11 in which the inverter includes four silicon controlled rectifiers and four secondary transformer windings wherein each secondary transformer winding is connected between the gate electrode and the cathode electrode of one of the silicon controlled rectifiers and wherein two of the secondary transformer windings are coupled to one-half of the second driver primary transformer winding and the other two secondary transformer windings are coupled to the other half of the second driver primary transformer winding so that as switching action in the second driver transistors causes current to flow to opposite halves of the second driver primary transformer winding on alternate half cycles, signals of positive polarity are applied on one-half cycle to the gate electrodes of the silicon controlled rectifiers whose gate electrodes are connected to secondary transformer windings coupled to one-half of the primary transformer winding and on the other half cycle to the gate electrodes of the silicon controlled rectifiers whose gate electrodes are connected to the secondary transformer windings coupled to the other half of the primary transformer winding.

References Cited

UNITED STATES PATENTS

| | | | |
|---|---|---|---|
| 2,682,002 | 6/1954 | Gibson | 321—15 XR |
| 2,843,815 | 7/1958 | Driver | 321—2 |
| 2,967,989 | 1/1961 | Eno et al. | 321—15 XR |
| 3,329,247 | 7/1967 | Jaeschke | 321—15 XR |
| 3,337,787 | 8/1967 | Joseph | 321—15 XR |
| 3,341,765 | 9/1967 | Rogers et al. | 321—45 XR |

LEE T. HIX, Primary Examiner

W. M. SHOOP, Jr., Assistant Examiner

U.S. Cl. X.R.

321—15, 45